(12) United States Patent
Gresset et al.

(10) Patent No.: US 10,285,332 B2
(45) Date of Patent: May 14, 2019

(54) ROUND BALER AND FEEDING ROLLER FOR WRAPPING MATERIAL

(71) Applicant: Deere & Company, Moline, IL (US)

(72) Inventors: Pascal Gresset, Auxon Dessous (FR); Henry D. Anstey, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 358 days.

(21) Appl. No.: 15/182,204

(22) Filed: Jun. 14, 2016

(65) Prior Publication Data

US 2016/0366829 A1 Dec. 22, 2016

(30) Foreign Application Priority Data

Jun. 16, 2015 (DE) .......... 10 2015 211 003

(51) Int. Cl.
*B65B 11/04* (2006.01)
*A01F 15/07* (2006.01)
*A01F 15/18* (2006.01)
*B65B 41/16* (2006.01)

(52) U.S. Cl.
CPC ........ *A01F 15/071* (2013.01); *A01F 15/0715* (2013.01); *A01F 15/18* (2013.01); *B65B 11/04* (2013.01); *B65B 41/16* (2013.01)

(58) Field of Classification Search
CPC .................................................. A01F 15/071

USPC ....................................................... 53/389.4
See application file for complete search history.

(56) References Cited

U.S. PATENT DOCUMENTS

| 5,129,208 | A | 7/1992 | Van Zee Daryl |
| 6,272,825 | B1 * | 8/2001 | Anderson ............. A01F 15/085 100/88 |
| 9,198,360 | B2 * | 12/2015 | Reijersen Van Buuren ................ A01F 15/071 |

FOREIGN PATENT DOCUMENTS

| DE | 3815985 C1 | 11/1989 |
| DE | 4037040 A1 | 6/1991 |
| DE | 10045842 A1 | 3/2002 |
| DE | 10211412 A1 | 10/2003 |
| EP | 1872648 A1 | 1/2008 |
| GB | 2163701 A | 3/1986 |

OTHER PUBLICATIONS

European Search Report in foreign counterpart application No. 16171879.6 dated Oct. 24, 2016 (8 pages).

* cited by examiner

*Primary Examiner* — Lori Baker

(57) ABSTRACT

A round baler is equipped with a bale-forming chamber, a storage reservoir for wrapping material, and a feeding roller that can be set into rotation at a specified rotational speed, in order to specify the speed at which the wrapping material is introduced from the storage reservoir into the bale-forming chamber. The feeding roller has, in its axially central area, a larger diameter than in its axial edge areas.

9 Claims, 1 Drawing Sheet

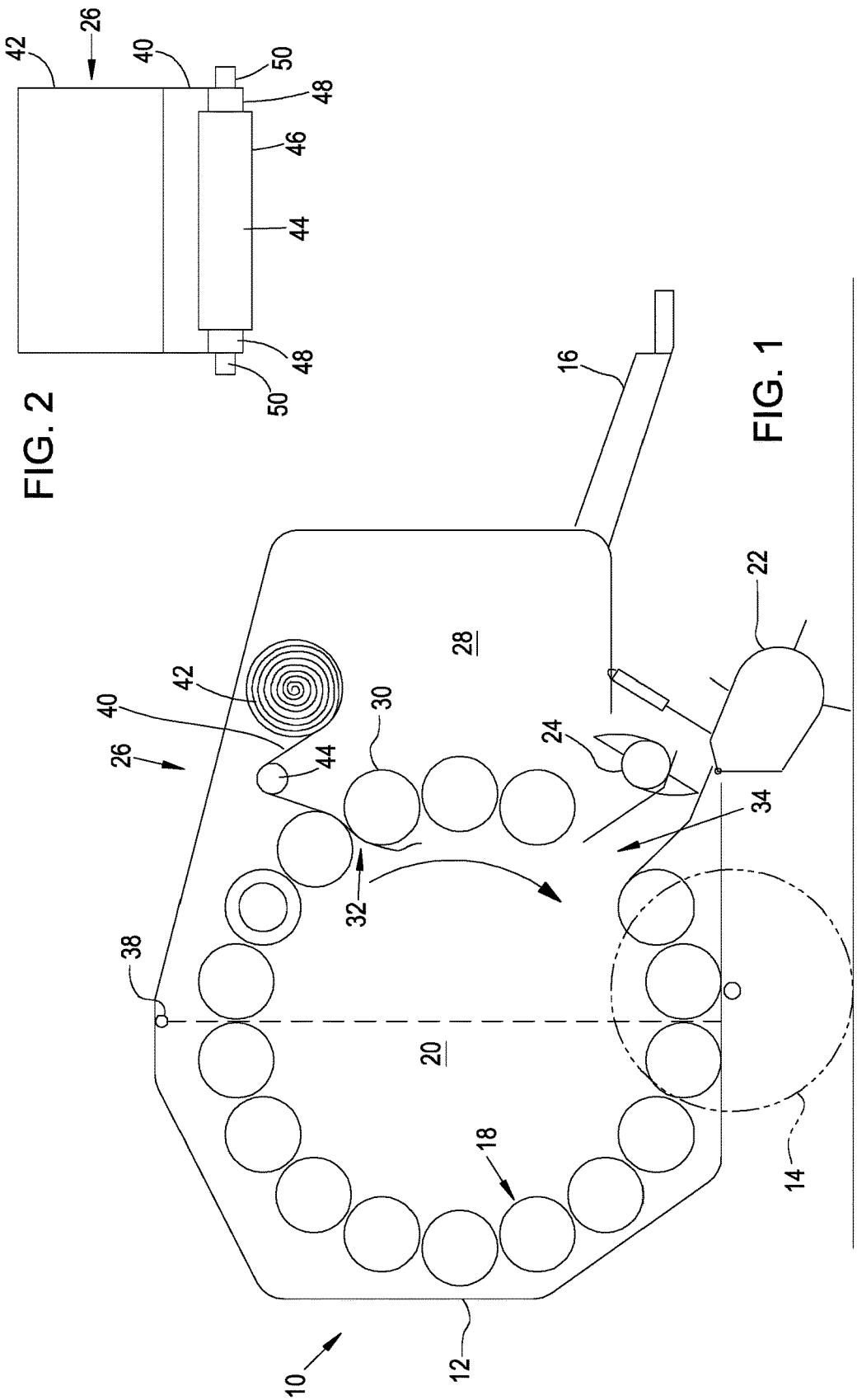

ROUND BALER AND FEEDING ROLLER FOR WRAPPING MATERIAL

CROSS-REFERENCE TO RELATED APPLICATIONS

Pursuant to 35 U.S.C. § 119, this application claims the benefit of and priority to German patent application no. 102015211003.6, filed on Jun. 16, 2015, which is herein incorporated by reference in its entirety.

FIELD OF THE DISCLOSURE

The disclosure relates to a round baler and a feeding device for wrapping material.

BACKGROUND

Round balers are used to form bales from stalk-shaped agricultural harvested produce. Such round balers have a bale-forming chamber and associated pressing means. After completion and optional wrapping of a bale with mesh, twine, or film, this bale is ejected out the back of the bale-forming chamber.

If a flat wrapping material, such as mesh or film, is used, this is fed in the prior art by means of a feeding roller that is typically coated with a rubber material or the like, in order to provide a high coefficient of friction. This feeding roller is driven at a circumferential speed that is smaller by a certain percentage than the circumferential speed of the bale-forming means (and thus of the bale), in order to maintain a desired tension in the wrapping material. Such feeding rollers are cylindrical in the prior art (cf. DE 102 11 412 A1) or are provided in any case with knurling in the central area, in order to simplify the introduction of the wrapping material into the bale-forming chamber (DE 100 45 842 A2).

If the bale is not precisely cylindrical due to non-uniform loading of the bale-forming chamber across its width, but instead is conical or barrel-shaped, it might happen that one or both lateral edges of the bale rotate at a slower circumferential speed than that of the feeding roller. This has the result that the wrapping material does not form a sufficiently taut contact against the edges of the bale in order to hold it together, so that the bale ultimately comes apart there.

Similar problems can happen if the storage reservoir roller of the wrapping material continues to turn after the cutting, and loops form at the edge of the wrapping material.

SUMMARY

The present disclosure provides a round baler and a feeding roller in which the disadvantages mentioned above are not present or are present at a reduced degree.

A round baler is equipped with a bale-forming chamber, a storage reservoir for wrapping material and a feeding roller that can be set into rotation at a specified rotational speed, in order to specify the speed at which the wrapping material is introduced from the storage reservoir into the bale-forming chamber. The width of the feeding roller usually matches, at least approximately, the width of the wrapping material and the bale-forming chamber, so that the lateral edge areas of the wrapping material that ultimately contact the axial outer edges of the bale interact with the axial edge areas of the feeding roller. In its axially central area, the feeding roller has a larger diameter than in its axial edge areas.

In other words, the feeding roller is not cylindrical, but instead provided on its edge areas with a smaller diameter compared to its center. In this way, it is achieved that the conveying speed at which the feeding roller moves the wrapping material into the bale-forming chamber (i.e., feeds it into the bale-forming chamber at the beginning of the wrapping process and then releases when the bale has gripped the wrapping material and is trying to pull the wrapping material from the feeding roller due to its higher circumferential speed) is smaller at the edge of the wrapping material than at its center. In this way, it is then also ensured, if the bale is not cylindrical, but instead conical or barrel-shaped, that the conveying speed of the wrapping material at the edge areas is not smaller than the circumferential speed of the bale. The edges of the bale are consequently wrapped in a sufficiently taut way also in such cases. The problems occurring in the prior art thus do not occur or occur only to a reduced degree.

The axial edge areas of the feeding roller can have a first diameter that is constant across its axial dimension, while the central area of the feeding roller has a second diameter that is constant across its axial dimension. The feeding roller thus has a step-shaped form. In another embodiment, however, the feeding roller can have, overall, a cigar-like, crowned, or double-cone-like shape. Intermediate forms, i.e., with edge areas with conical, crowned, or semi-cigar-like shapes and cylindrical central area or conical or semi-cigar-like or crowned transitions between cylindrical edge areas and the cylindrical central area are also conceivable.

The wrapping material is, in particular, a mesh.

BRIEF DESCRIPTION OF THE DRAWINGS

In the drawings is shown an embodiment of the disclosure described in more detail below, wherein the reference symbols should not be used to limit the scope of the claims. Shown are:

FIG. 1 a schematic lateral view of a round baler, and

FIG. 2 a plan view of the enveloping device of the round baler with a storage reservoir roller of the wrapping material and an associated feeding roller for transporting the wrapping material.

DETAILED DESCRIPTION

A round baler 10 shown schematically in FIG. 1 contains, among other things, a chassis 12, wheels 14, a tow bar 16, pressing apparatus 18, a bale-forming chamber 20, a pick-up device 22, a conveyor 24, and an enveloping device 26.

The round baler 10 is used for picking up and pressing harvested produce lying on the ground into a bale, namely a round bale, as is known. However, it could also be used for pressing economic goods, such as fabrics, trash, films, etc.

The chassis 12 is formed by a not-shown threaded assembly and/or welded assembly, on whose bottom side a not-shown shaft for mounting the wheels 14 is located that is connected in the front to the tow bar 16 and carries, on the side, lateral walls 28. The wheels 14 are used for supporting the round baler 10 on the ground and for advancing it across, in particular, a field onto which the pressed goods are deposited. With the tow bar 16, the round baler 10 can be attached to a not-shown tractor, e.g., a general-purpose agricultural tractor.

The term pressing apparatus 18 is used below as a generic term for all conceivable constructions in designs with single or multiple parts. The pressing apparatus 18 is constructed in this embodiment as a plurality of pressing rollers 30 whose rotational axes run parallel to each other and are positioned on a circular arc. With the exception of a wrapping material inlet opening 32 and a harvested produce inlet opening 34, the pressing rollers 30 enclose the bale-forming chamber 20 essentially completely around the circumference. With reference to the clockwise direction of rotation and FIG. 1, the wrapping material inlet opening 32 is located approximately at a 2 o'clock position and the harvested produce inlet opening 34 is located at a 4:30 position. Seen in the circumferential direction, the width of the harvested produce inlet opening 34 corresponds approximately to that of one and a half pressing rollers 30. The position of the wrapping material inlet opening 32 can be varied. Instead of this pressing apparatus 18, which is predominantly suitable for a bale-forming chamber 20 with a constant volume, a pressing apparatus 18 could also be provided that has flexible elements such as pivoting pressing rollers, belts, chains, and the like, with which the size of the bale-forming chamber 20 can be variably shaped, as is known. The pressing apparatus 18 is set in rotation in a way that is not shown, e.g., by means of a drive shaft, transmission, and chain. The drive of the pressing apparatus 18 takes place in this embodiment such that a bale rotates in the bale-forming chamber 20 in accordance with the arrow shown there.

The bale-forming chamber 20 can be of a fixed or variable size and is used for holding and compacting the pressed goods. Conventionally, the bale-forming chamber 20 is divided in the vertical direction into front and rear halves that are connected to each other at an upper bearing 38, so that the rear half can be lifted for ejecting the bale. The pick-up device 22 picks up harvested produce laying on the ground in a swath during operation and guides it optionally with the help of the conveyor 24 through a harvested produce inlet 34 into the bale-forming chamber 20. The conveyor 24, which can also be constructed as a cutting device and is provided only as an option, receives the pressed goods from the pick-up device 22, optionally threshes it, and leads it into the bale-forming chamber 20.

The enveloping device 26 is used to introduce, after a bale has been completed, wrapping material 40 into the bale-forming chamber 20, where it is gripped and carried along by the circumferential surface of the turning bale until it wraps around the bale and thus has bound the bale. The enveloping device 26 accordingly contains a roller-shaped storage reservoir 42 of wrapping material 40 that is unwound from the storage reservoir 42 and contacts a feeding roller 44 and is fed from this roller into the wrapping material inlet opening 32. The enveloping device 26 can also include a cutting device (not shown) for cutting the end of the wrapping material 40 from a bale, as well as guiding apparatus for inserting the beginning of the wrapping material 40 into the wrapping material inlet opening 32. Because both are known, they are not discussed in detail below. The wrapping material inlet opening 32 could also be shaped wider than in FIG. 1, so that the wrapping material 40 can enter into the bale-forming chamber 20 without a problem, without becoming wrapped around the pressing rollers 30 adjacent to the wrapping material inlet opening 32.

The wrapping material 40 is usually constructed as a mesh, but could also be a film. In the embodiment according to FIG. 1, the wrapping material 40 is approximately as wide as a bale formed in the bale-forming chamber 20, although it could also be wider than the bale, in order to also cover a part of its end side outside of its circumferential side. In particular, a wrapping material 40 constructed as a mesh is gripped for contact with a rotating bale by the projecting harvested produce stalks, clamped in the area between the bale circumferential surface and the inner side of the pressing rollers 30, and finally wrapped around the bale.

The feeding roller 44 feeds the wrapping material 40 at the beginning of the wrapping process into the bale-forming chamber 20. Then, when the bale has gripped the wrapping material 40, it specifies the speed at which the bale pulls the wrapping material 40 into the bale-forming chamber 20. In order to provide a sufficient friction between the feeding roller 44 and the wrapping material 40, the feeding roller 44 is usually coated with a suitable material such as rubber.

As is shown in FIG. 2 in the top view of the enveloping device 26, the feeding roller 44 has a step-like shape. Its central area 46 is cylindrical and has a larger diameter than its axial edge areas 48, which are also cylindrical. The axial dimensions of the central area, and axial edge areas 48 of the feeding roller 44 used for conveying the wrapping material 40 approximately match the width of the wrapping material 40. The feeding roller 44 is supported in the chassis 12 on stub shafts 50 that do not come in contact with the wrapping material 40.

The feeding roller 44 is driven during the wrapping process at a speed that has the result that the central area 46 turns at a circumferential speed that is smaller by a certain percentage than the circumferential speed of the pressing rollers 30 (or the bale). In this way, it is ensured that the wrapping material 40 is wound with a sufficient tension around the bale. In the axial edge areas 48, the circumferential speed of the feeding roller 44 (due to the diameter that is smaller there than in the central area 46) is even smaller than in the central area 46, which has the result that even for conical or barrel-shaped bales, their edge areas are wrapped with sufficient tension.

The invention claimed is:

1. A round baler comprising:
    a bale-forming chamber;
    a storage reservoir storing a wrapping material; and
    a feeding roller engaged to the wrapping material and rotating at a rotational speed to feed the wrapping material from the storage reservoir into the bale-forming chamber, the feeding roller having an axially central portion and two axial edge portions respectively coupled to the central portion coaxially, a diameter of the axially central portion larger than the diameters of the axial edge portions such that a circumferential speed of the axially central portion is higher than circumferential speeds of the axial edge portions.

2. The round baler of claim 1, wherein the axial edge portions of the feeding roller have a first diameter that is constant across its axial dimension, and the axially central portion of the feeding roller has a second diameter that is constant across its axial dimension.

3. The round baler of claim 1, wherein the wrapping material is a mesh.

4. A feeding roller for use in a round baler having a bale-forming chamber and a storage reservoir storing the wrapping material, the feeding roller engaged to the wrapping material and rotating at a rotational speed to feed the wrapping material from the storage reservoir into the bale-forming chamber, comprising:
    an axially central portion and two axial edge portions respectively coupled to the central portion coaxially, a diameter of the axially central portion larger than the diameters of the axial edge portions such that a circumferential speed of the axially central portion is higher than circumferential speeds of the axial edge portions.

5. The round baler of claim 1, wherein the bale-forming chamber accommodates a bale configured to rotate within the bale-forming chamber after the bale is completely formed, and the circumferential speed of the axially central portion is smaller than a circumferential speed of the bale when the wrapping material is fed into the bale-forming chamber.

6. The round baler of claim 5, wherein the bale is one of conical or barrel-shaped.

7. The round baler of claim 1, comprising a plurality of pressing rollers positioned within the bale-forming chamber to form the bale, and the wrapping material transmitted from the feeding roller into an inlet opening between two of the pressing rollers.

8. The round baler of claim 1, wherein a sum of the axially central portion and the axial edge portions of the feeding roller in axial dimension matches a width of the wrapping material.

9. The round baler of claim 1, wherein the feeding roller rotates about a first axis parallel to a second axis about which the storage reservoir rotates.

\* \* \* \* \*